US008929396B2

(12) United States Patent
Effenberger et al.

(10) Patent No.: US 8,929,396 B2
(45) Date of Patent: Jan. 6, 2015

(54) ETHERNET MEDIA ACCESS CONTROL ORGANIZATION SPECIFIC EXTENSION

(75) Inventors: Frank J. Effenberger, Freehold, NJ (US); Lin Wei, Shenzhen (CN); Yang Sulin, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 508 days.

(21) Appl. No.: 12/494,649

(22) Filed: Jun. 30, 2009

(65) Prior Publication Data

US 2010/0002592 A1    Jan. 7, 2010

Related U.S. Application Data

(60) Provisional application No. 61/078,711, filed on Jul. 7, 2008.

(51) Int. Cl.
*H04J 3/24* (2006.01)
*H04L 12/24* (2006.01)
*H04Q 11/00* (2006.01)

(52) U.S. Cl.
CPC .............. *H04L 12/24* (2013.01); *H04L 41/00* (2013.01); *H04Q 11/0062* (2013.01); *H04Q 2011/0079* (2013.01)
USPC .......................................... 370/474; 370/241

(58) Field of Classification Search
USPC ........................... 370/241–252, 389, 392, 474
See application file for complete search history.

(56) References Cited

U.S. PATENT DOCUMENTS

| | | | |
|---|---|---|---|
| 2005/0013307 A1* | 1/2005 | Park | 370/395.53 |
| 2006/0153220 A1* | 7/2006 | Elie-Dit-Cosaque et al. | 370/432 |
| 2007/0140691 A1* | 6/2007 | Gao et al. | 398/38 |
| 2008/0016402 A1* | 1/2008 | Harel et al. | 714/43 |
| 2008/0031261 A1* | 2/2008 | Addeo et al. | 370/395.53 |
| 2008/0101241 A1* | 5/2008 | Mohan et al. | 370/236.2 |
| 2008/0291832 A1* | 11/2008 | Bordogna et al. | 370/236 |

FOREIGN PATENT DOCUMENTS

| | | |
|---|---|---|
| CN | 1897497 A | 1/2007 |
| CN | 1988502 A | 6/2007 |
| CN | 101119244 A | 2/2008 |
| WO | 2007033204 A2 | 3/2007 |
| WO | 2008054817 A1 | 5/2008 |

OTHER PUBLICATIONS

IEEE Standard, P802.3av, "Part 3: Carrier Sense Multiple Access with Collision Detection (CSMA/CD) Access Method and Physical Layer Specifications—Amendment: Physical Layer Specifications and Management Parameters for 10 Gb/s Passive Optical Networks," IEEE Draft P802.3av/D2.2, Dec. 3, 2008.

(Continued)

*Primary Examiner* — Kan Yuen
(74) *Attorney, Agent, or Firm* — Conley Rose, P.C.; Grant Rodolph; Jonathan K. Polk

(57) ABSTRACT

An apparatus comprising a data framer configured to frame a Media Access Control (MAC) control message for transmission, the MAC control message comprising an organization specific identifier (OUI) and at least one type-length-value (TLV) comprising a type field, a length field, and a value field, wherein a format of the TLV is specified by the OUI, and wherein the value field comprises information related to operation, administration, and maintenance (OAM) features of a network. Also included is an apparatus comprising at least one component configured to implement a method comprising compiling an OAM message comprising a plurality of organization-specific TLVs and an organization unique identifier (OUI) that indicates an organization responsible for the format of the TLV, and transmitting the OAM message.

22 Claims, 4 Drawing Sheets

(56) References Cited

OTHER PUBLICATIONS

International Telecommunications Union Standard, ITU-T Series G: "Transmission Systems and Media, Digital Systems and Networks—Digital Sections and Digital Line System—Optical Line Systems for Local and Access Networks—Gigabit-Capable Passive Optical Networks (G-PON): ONT Management and Control Interface Specification", G.984.4, Feb. 2008.

"Part 3: Carrier Sense Multiple Access with Collision Detection (CSMA/CD) Access Method and Physical Layer Specification, Amendment: Physical Layer Specifications and Management Parameters for 10 Gb/s Passive Optical Networks," Draft Amendment to IEEE Std 802.3-2008, IEEE P802.3av™ D3.3.1, Jun. 9, 2009.

Complete List of IEEE Recognized Ethertype values, http://standards.ieee.org/develop/regauth/ethertype/eth.txt, downloaded Jul. 5, 2011.

Foreign communication from a counterpart application, PCT application PCT/CN2009/072657, English translation International Search Report dated Sep. 24, 2009, 4 pages.

Foreign communication from a counterpart application, PCT application PCT/CN2009/072657, English translation International Preliminary Report on Patentability dated Jan. 11, 2011, 5 pages.

"Part 3: Carrier Sense Multiple Access with Collision Detection (CSMA/CD) Access Method and Physical Layer Specifications," Section Two—Information Technology—Telecommunications and Information Exchange Between Systems—Local and Metropolitan Area Networks—Specific Requirements, IEEE 802.3, 2005, 810 pages.

\* cited by examiner

ETHERNET MEDIA ACCESS CONTROL ORGANIZATION SPECIFIC EXTENSION

CROSS-REFERENCE TO RELATED APPLICATIONS

The present application claims priority to U.S. Provisional Patent Application 61/078,711, filed Jul. 7, 2008 by Frank J. Effenberger et al., and entitled "Ethernet Media Access Control Organization Specific Extension," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point-to-multi-point (P2MP) network comprised of an optical line terminal (OLT) at the central office, an optical distribution network (ODN), and a plurality of optical network units (ONUs) at the customer premises. In some PON systems, such as Gigabit PON (GPON) systems, downstream data is broadcasted at about 2.5 Gigabits per second (Gbps) while upstream data is transmitted at about 1.25 Gbps. Further, some PON systems, such as Ethernet PON (EPON) systems, may support Ethernet technology. Ethernet technology is widely used for transporting data in a plurality of networks because of its relatively simple implementation and available equipment. However, Ethernet technology lacks some advanced features for current and desirable network operations, such as some operation, administration, and maintenance (OAM) features.

SUMMARY

In one embodiment, the disclosure includes an apparatus comprising a data framer configured to frame a Media Access Control (MAC) control message for transmission, the MAC control message comprising an organization unique identifier (OUI) and at least one type-length-value (TLV) comprising a type field, a length field, and a value field, wherein a format of the TLV is specified by the OUI, and wherein the value field comprises information related to OAM features of a network.

In another embodiment, the disclosure includes an apparatus comprising at least one component configured to implement a method comprising compiling an OAM message comprising a plurality of organization-specific TLVs and an organization unique identifier (OUI) that indicates an organization responsible for the format of the TLV, and transmitting the OAM message.

In yet another embodiment, the disclosure includes a method comprising adding a header to a MAC control message, wherein the header comprises an opcode that indicates that the MAC control message comprises an organizational-specific message, formatting a MAC control information according to an organizational format, adding the MAC control information to the MAC control message, wherein the MAC control information comprises an indicator of the organizational format, adding a footer to the MAC control message, and transmitting the MAC control message.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

MAC control related protocols in PON systems that support Ethernet technology, such as EPONs, may comprise a plurality of MAC control messages that provide limited OAM features. For instance, a Multi-Point Control Protocol (MPCP) may comprise about five operation codes (opcodes) that specify about five different MAC control messages, which may not be sufficient to implement advanced OAM features or functions. Other PON systems, such as GPONs, may use a Physical Layer OAM (PLOAM) channel that support the functions provided by the MPCP as well as other OAM functions, such as data privacy, protection switching, authentication, fault and performance monitoring, and configuration of a management channel.

Disclosed herein is a system and method for extending the functionality of the MAC control protocol in a PON, such as the EPON, using an improved MAC control message. The MAC control message may comprise control information specified by organizations other than the organization that specifies the MAC control message format. For example, the MAC control message format may be specified by the Institute of Electrical and Electronics Engineers (IEEE), while the control information contained in the MAC control message is formatted as specified by an Enterprise, such as Huawei, Cisco, or Alcatel. The MAC control message may comprise an opcode that indicates that the message comprises control information having a format that is organization specific. Specifically, the payload may comprise a plurality of organization specific messages, for example TLVs, and an OUI that indicates an organization responsible for the message format. The PON may use the MAC control message to implement advanced OAM features, and hence extend its MAC control protocol.

Figure 1:
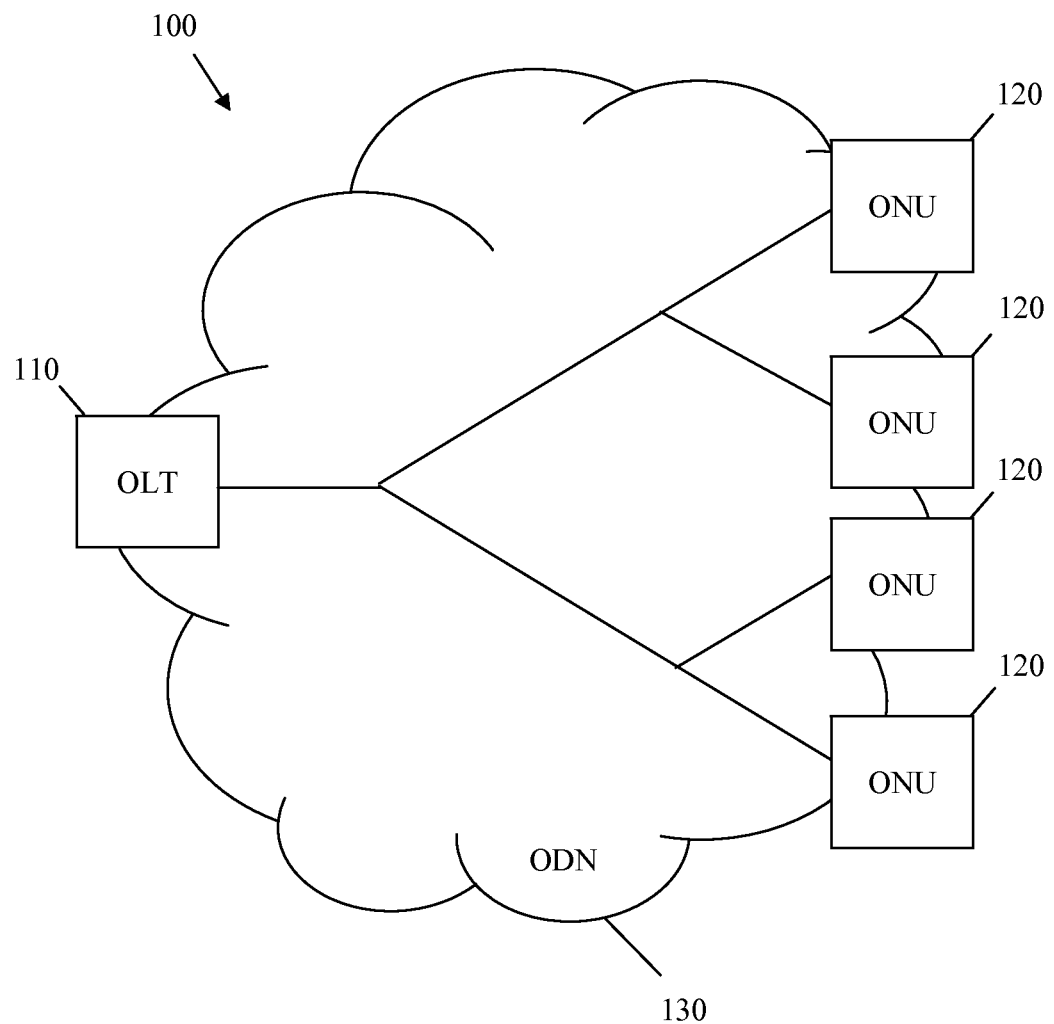
FIG. 1 is a schematic diagram of an embodiment of a PON.

FIG. 1 illustrates one embodiment of a PON 100. The PON 100 comprises an OLT 110, a plurality of ONUs 120, and an ODN 130, which may be coupled to the OLT 110 and the ONUs 120. The PON 100 may be a communications network that does not require any active components to distribute data between the OLT 110 and the ONUs 120. Instead, the PON 100 may use the passive optical components in the ODN 130 to distribute data between the OLT 110 and the ONUs 120. The PON 100 may be Next Generation Access (NGA) systems, such as ten Gbps GPONs (or XGPONs), which may have a downstream bandwidth of about ten Gbps and an upstream bandwidth of at least about 2.5 Gbps. Other examples of suitable PONs 100 include the asynchronous transfer mode PON (APON) and the broadband PON (BPON) defined by the ITU-T G.983 standard, the GPON defined by the ITU-T G.984 standard, the EPON defined by the IEEE 802.3ah standard, 10G EPON as defined by the IEEE 802.3av standard, and the wavelength division multiplexed (WDM) PON (WPON), all of which are incorporated herein by reference as if reproduced in their entirety.

In an embodiment, the OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking/Synchronous Digital Hierarchy (SONET/SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

In an embodiment, the ONUs 120 may be any devices that are configured to communicate with the OLT 110 and a customer or user (not shown). Specifically, the ONUs 120 may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. Additionally, the ONUs 120 may comprise a converter that converts the optical signal into electrical signals for the customer, such as signals in the Ethernet or asynchronous transfer mode (ATM) protocol, and a second transmitter and/or receiver that may send and/or receive the electrical signals to a customer device. In some embodiments, ONUs 120 and optical network terminals (ONTs) are similar, and thus the terms are used interchangeably herein. The ONUs may be typically located at distributed locations, such as the customer premises, but may be located at other locations as well.

In an embodiment, the ODN 130 may be a data distribution system, which may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the ONUs 120. Alternatively, the ODN 130 may comprise one or a plurality of active components, such as optical amplifiers. The ODN 130 may typically extend from the OLT 110 to the ONUs 120 in a branching configuration as shown in FIG. 1, but may be alternatively configured in any other point-to-multi-point configuration.

In an embodiment, the OLT 110 and/or the ONUs 120 may comprise a data framer, which may be coupled to the transmitter and/or the receiver. The data framer may be any device configured to process the data between the OLT 110 and the ONUs 120 by framing the data into frames or obtaining the data from the frames according to a PON protocol, such as IEEE 802.3ah and/or 802.3av. The data framer may be hardware, such as a processor, comprising electronic or logic circuitry, which may be designed for such purpose. Alternatively, the data framer may be software or firmware, which may be programmed for such purpose. Specifically, the data framer may be configured to generate MAC control messages, which may be used to promote OAM functions in the PON 100. The data framer may be configured to generate different control messages, for instance to implement different OAM functions according to different organizations or architectures. For example, the data framer may frame control data for different providers, customer networks, or standardization and/or regulatory organizations (e.g. IEEE, ITU-T, etc.) into a MAC control message.

Figure 2:
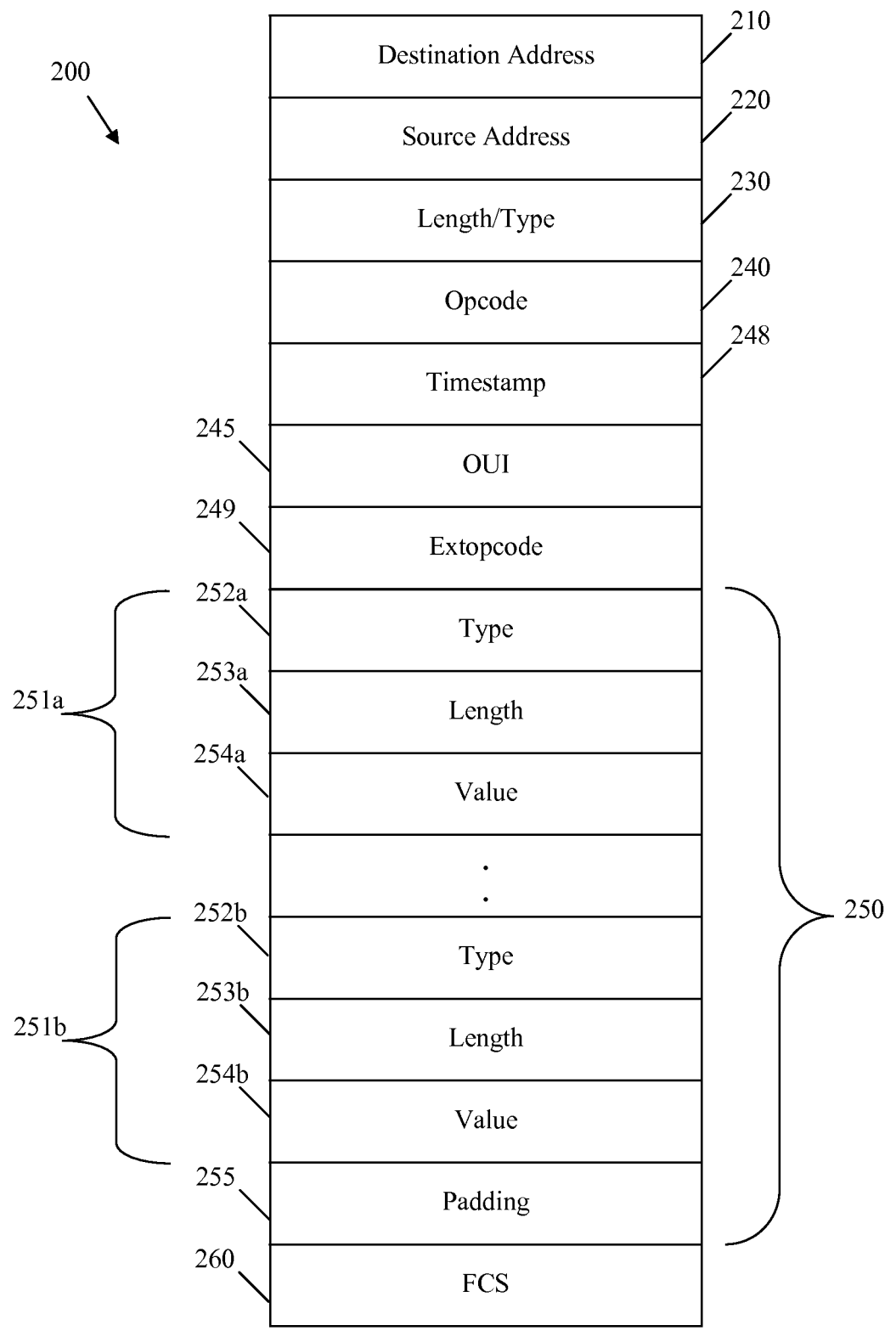
FIG. 2 is an illustration of an embodiment of a MAC control message.

FIG. 2 illustrates an embodiment of a MAC control message 200, which may be generated or received by the data framer, for example at in the OLT 110 and/or the ONU 120. The MAC control message 200 may have an Ethernet message format. Specifically, the MAC control message 200 may comprise a destination address (DA) 210, a source address (SA) 220, a length/type 230, an opcode 240, an OUI 245, and a payload 250. The MAC control message 200 may also comprise a timestamp 248, an extopcode 249, and a frame check sequence (FCS) 260. In an embodiment, the length of each of the DA 210 and SA 220 may be equal to about six bytes, the length of each of the length/type 230 and opcode 240 may be equal to about two bytes, the length of each of the timestamp 245 and FCS 260 may be equal to about four bytes, and the length of the payload 250 may be equal to about 40 bytes.

The DA 210 may comprise a network address, such as a MAC address, for a destination node, which may be intended to receive the data, e.g. the OLT or one of the ONUs. The SA 220 may comprise a network address for a source node, which may originate the MAC control message 200. The length/type 230 may be used to indicate that the message's length and type corresponds to a MAC control message. For instance, the length/type 230 may be set to 88-08 according to IEEE 802.3av. The opcode 240 may be used to indicate that the MAC control message 200 is an MAC control message that comprises control information formatted according to at least one external organization, e.g. an organization other than the organization that specified the format of the MAC control frame. For instance, the opcode 240 may be assigned one of the reserved opcodes in the MPCP protocol, such as about seven (e.g. opcode=00-07), to indicate that the MAC control message 200 comprises organization specific messages formatted according to other organizations' formats. The timestamp 248 may comprise the time of originating or transmitting the MAC control message 200, which may be used for synchronization and/or message sequencing. Alternatively, the timestamp 245 may comprise an expiration time for the MAC control message 200. The OUI 245 may specify the organization responsible for the message format. For instance, the OUI may be set to a specific value to indicate that the message is formatted as specified by a specific organization, which may be a standards organization such as IEEE or ITU, an Enterprise such as Huawei, Cisco, or Alcatel, or any other organization. The extopcode 249 may specify that the message is a protocol message formatted by the specified organization. The FCS 260 may be used for error detection and correction, such as a Cyclic Redundancy Check (CRC) or other checksum.

The payload 250 may comprise at least one control message that is formatted as specified by the organization associated with the OUI 245. Specifically, the payload 250 may comprise at least one organization specific message 251 and optionally a padding 255. Further, the different organization specific messages 251 may be different control messages comprising different control information or functions. For example, the payload 250 may comprise two organization specific messages 251a and 251b that are formatted per the same organization. In an embodiment, each organization specific message 251 may be a TLV, which may comprise a type field 252, a length field 253, and a value field 254, which may differ between the two organization specific messages 251a and 251b. Specifically, each type field 252 may indicate a different control message, for instance for a different OAM function. As such, the type field 252a for the first organization specific message 251a may be set to a first value to indicate that the first organization message 251a corresponds to a first control function, while the type field 252b for the second organization specific message 251b may be set to a second value to indicate that the second organization message 251b corresponds to a second control function as specified by the same organization. Accordingly, the length field 253a may be different than the length field 253b, and the value field 254a may comprise different control information than the value field 254b.

Any of the components described herein may comprise a reference table that correlates a plurality of OUIs or OUI values to a plurality of message formats as specified by a plurality of different organizations. Table 1 illustrates an embodiment of a table, which may be used to associate the OUIs with the corresponding organizational formats. Specifically, Table 1 may comprise a list of OUIs and a list of matching organizations, where the OUIs may be uniquely assigned to the organizations. A single organization may also support a plurality of different formats, and such may be indicated in the reference table by using separate OUIs for the various formats. The OUI 245 in the MAC control message 200 may be assigned a value from one of the entries in the Table 1 that corresponds to the organization format of the MAC control message 200 or the organization specific messages 251 in the MAC control message 200. Moreover, when a MAC control message 200 is received, the OUI value in the OUI 245 may be compared to the entries in the Table 1, and the OUI may be matched with one of the entries in the table to obtain the specific organization corresponding to the OUI. When the MAC control message 200 is associated with the organization responsible for the format of the message, the message content may be decoded in accordance with the organization specifications and the control information may be processed appropriately.

TABLE 1

| OUI | Organizational Format |
|---|---|
| OUI 1 | Organizational Format 1 |
| . | . |
| . | . |
| . | . |
| OUI N | Organizational Format N |

In an embodiment, the length of the type field 252 and the length field 253 may be equal to about three bytes and one byte, respectively, and the length of the value field 254 may be, for instance based on the control information and the specific organization specification. When the overall length of the payload 250 is fixed, the length of the padding 255 may be equal to the remaining length of the payload 250 excluding the combined length of the organization specific messages 251. For example, if the payload length is limited to 40 bytes, then the length of the padding 255 may be equal to about $40-\Sigma_{i=1}^{N}(4+L_i)$ bytes, where $L_i$ is the length or the $i^{th}$ organization specific message 251, N is the quantity of organization specific messages 251 in the payload 250, and i is an integer.

Figure 3:
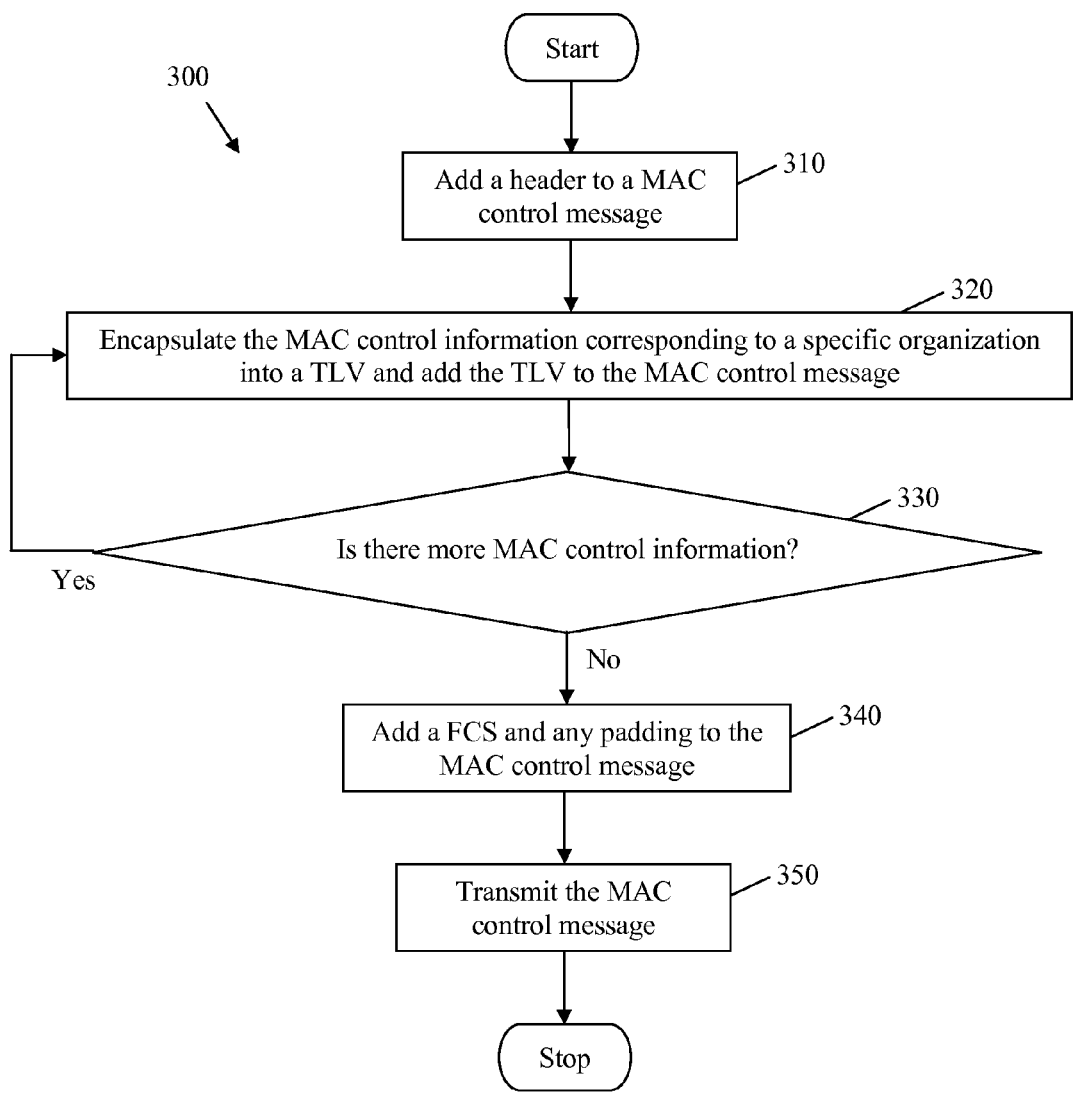
FIG. 3 is a flowchart of an embodiment of a message framing method.

FIG. 3 illustrates one embodiment of a message framing method 300, which may be used to encapsulate the MAC control information into an organization-specific MAC control message, such as the MAC control message described above. The message framing method 300 may begin at block 310, where a header may be added to a MAC control message. The header may comprise the OUI indicating the organizational format of the MAC control message. For instance, the OUI may be obtained from a reference table, such as Table 1, where a plurality of organizations may be assigned a plurality of unique OUIs. Additionally, the header may comprise the DA, the SA, the length/type, the opcode, the timestamp, or combinations thereof. The message framing method 300 may then proceed to block 320, where an organization specific message, such as the organization specific message described above, may then be added to the MAC control message.

Next, at block 330, the message framing method may verify whether there is more MAC control information corresponding to the specified organization. For instance, the OLT or ONT may need to communicate additional OAM data and/or MAC control protocol related data. The message framing method 300 may return to block 320 if the condition in block 330 is met or may proceed to block 340 if there is no more control information. At block 340, the message framing method 300 may add the padding (if required) and the FCS to the MAC control message. Next, at block 350, the message framing method 300 may transmit the MAC control message. In other embodiments, the message framing method 300 may additionally or alternatively receive the transmitted MAC control message and obtain the control information by interpreting the MAC control message, for instance by substantially executing the reverse sequence of blocks above.

Figure 4:
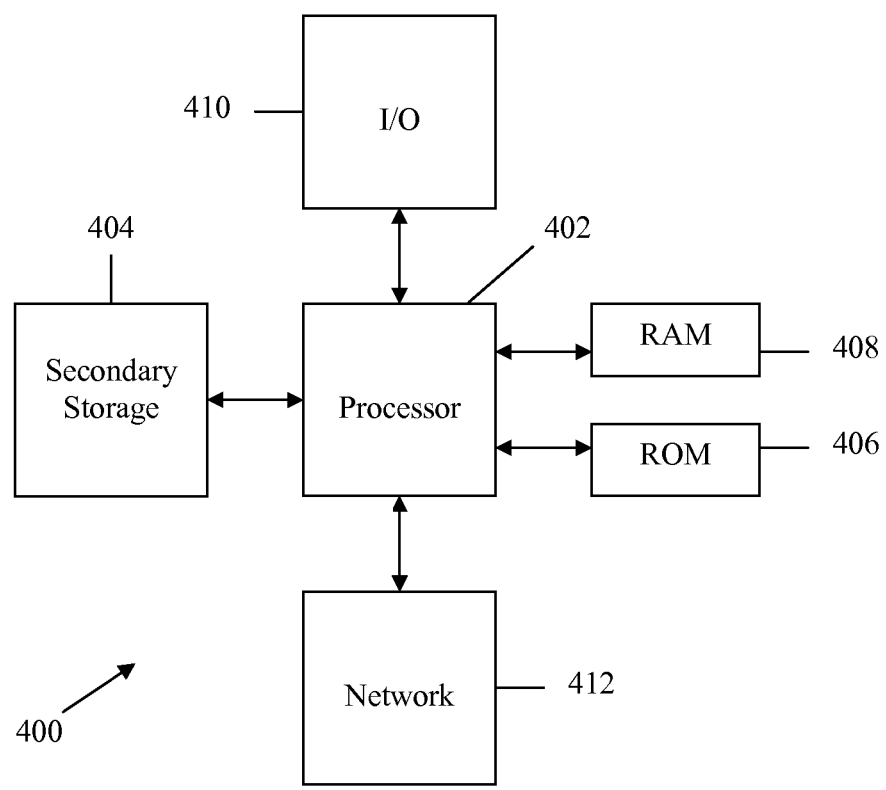
FIG. 4 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 4 illustrates a typical, general-purpose network component 400 suitable for implementing one or more embodiments of the components disclosed herein. The network component 400 includes a processor 402 (which may be referred to as a central processor unit or CPU) that is in communication with memory devices including secondary storage 404, read only memory (ROM) 406, random access memory (RAM) 408, input/output (I/O) devices 410, and network connectivity devices 412. The processor 402 may be implemented as one or more CPU chips, or may be part of one or more application specific integrated circuits (ASICs).

The secondary storage 404 is typically comprised of one or more disk drives or tape drives and is used for non-volatile storage of data and as an over-flow data storage device if RAM 408 is not large enough to hold all working data. Secondary storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of secondary storage 404. The RAM 408 is used to store volatile data and perhaps to store instructions. Access to both ROM 406 and RAM 408 is typically faster than to secondary storage 404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a data framer coupled to a transmitter and configured to frame a Media Access Control (MAC) control message for transmission, the MAC control message comprising a length/type field, an organization unique identifier (OUI), and at least one type-length-value (TLV) field comprising a type sub-field, a length sub-field, and a value sub-field,
wherein the length/type field is set to 88-08 to indicate that the MAC control message is an Institute of Electrical and Electronics Engineers (IEEE) 802.3 MAC control frame,
wherein a format of the TLV field is specified by the OUI, and
wherein the value sub-field comprises information related to operation, administration, and maintenance (OAM) features of a network,
wherein the MAC control message further comprises a padding, and
wherein the padding has a length equal to a payload minus $\Sigma_{i=1}^{N}(4+L_i)$ bytes, where $L_i$ is the length of the $i^{th}$ TLV, N is a quantity of TLVs in the MAC control message, and i is an integer.

2. The apparatus of claim 1, wherein the type sub-field specifies a specific control message in a protocol associated with the OUI.

3. The apparatus of claim 2, wherein the type sub-field has a length equal to three bytes and the length sub-field has a length equal to one byte.

4. The apparatus of claim 2, wherein the MAC control message comprises a plurality of second TLV fields, wherein each of the second TLV fields comprise different type values.

5. The apparatus of claim 1, wherein the OUI is associated with one out of a plurality of organizational formats using a reference table.

6. The apparatus of claim 5, wherein a plurality of organizations are associated with the plurality of organizational formats, and wherein at least some of the organizations comprise an enterprise.

7. The apparatus of claim 1, wherein the MAC control message further comprises an opcode set to 00-07.

8. An apparatus comprising:
a processor; and
a memory coupled to the processor and comprising instructions that, when executed by the processor, cause the apparatus to:
compile a Media Access Control (MAC) control message comprising a length/type field, a plurality of organization-specific type-length-values (TLVs), and an organization unique identifier (OUI) that indicates an organization responsible for a format of the TLV; and
transmit the MAC control message,
wherein the length/type field is set to 88-08 to indicate that the MAC control message is an Institute of Electrical and Electronics Engineers (IEEE) 802.3 MAC control frame,
wherein the MAC control message further comprises a padding, and wherein the padding has a length equal to a payload minus $\Sigma_{i=1}^{N}(4+L_i)$ bytes, where $L_i$ is the length of the $i^{th}$ TLV, N is a quantity of TLVs in the MAC control message, and i is an integer.

9. The apparatus of claim 8, wherein the organization is an enterprise.

10. The apparatus of claim 8, wherein the MAC control message further comprises an operation code (opcode) indicating that the MAC control message comprises the organization-specific TLV.

11. The apparatus of claim 8, wherein the TLVs comprise different control messages.

12. The apparatus of claim 8, wherein a combined length of all the TLVs does not exceed a payload length of the MAC control message.

13. The apparatus of claim 8, wherein the apparatus is further configured to:
    receive a second MAC control message similar to the MAC control message, wherein the second MAC control message comprises a second OUI and a second length/type field set to 88-08 to indicate that the second MAC control message is an IEEE 802.3 MAC control frame;
    obtain a second plurality of TLVs from the second MAC control message;
    consult a reference table to determine the format of the second plurality of TLVs based on the second OUI; and
    decode a control information in the second plurality of TLVs.

14. A method comprising:
    adding a header to a Media Access Control (MAC) control message, wherein the header comprises an operation code (opcode) that indicates that the MAC control message comprises an organizational-specific message and a length/type field that is set to 88-08 to indicate that the MAC control message is an Institute of Electrical and Electronics Engineers (IEEE) 802.3 MAC control frame;
    formatting a MAC control information according to an organizational format;
    adding the MAC control information to the MAC control message, wherein the MAC control information comprises an indicator of the organizational format;
    adding a footer to the MAC control message; and
    transmitting the MAC control message,
    wherein the MAC control message further comprises a padding, and
    wherein the padding has a length equal to a payload minus $\Sigma_{i=1}^{N}(4+L_i)$ bytes, where $L_i$ is the length of an $i^{th}$ type-length-value (TLV) in the MAC control message, N is a quantity of TLVs in the MAC control message, and i is an integer.

15. The method of claim 14 further comprising:
    receiving the MAC control message;
    interpreting the MAC control information using the organizational format corresponding to the indicator; and
    obtaining the MAC control information.

16. The method of claim 15, wherein the MAC control information relates to advanced features of a passive optical network (PON) standard or a Multi-Point Control Protocol (MPCP) protocol.

17. The method of claim 16, wherein the PON is an Ethernet PON (EPON).

18. An apparatus comprising:
    a media access control (MAC) sublayer component configured to:
        receive a MAC control information (MA_CONTROL.request) containing an Extension operation code (opcode) from a MAC client; and
        call a MAC sublayer with a MAC data request (MA_DATA.request) service comprising the following parameters:
            a destination address that is set equal to a destination address parameter of the MA_CONTROL.request;
            a source_address that is set equal to a 48 bit individual address of a station;
            a length/type field within a mac_service_data_unit parameter that is set to 88-08;
            a remainder of the mac_service_data_unit that is set to a concatenation of the Extension opcode, an International Telecommunication Union (ITU) Standardization Sector (ITU-T) organizationally unique identifier (OUI), and an organization-specific data; and
            a frame check sequence (frame_check_sequence) is omitted,
        wherein the MAC control information further comprises a padding, and
        wherein the padding has a length equal to a payload minus $\Sigma_{i=1}^{N}(4+L_i)$ bytes, where $L_i$ is the length of the $i^{th}$ type-length-value (TLV) in the MAC control information, N is a quantity of TLVs in the MAC control information, and i is an integer.

19. An optical line terminal (OLT) comprising:
    an optical transmitter; and
    a data framer coupled to the optical transmitter and configured to frame a Media Access Control (MAC) control message for transmission by the optical transmitter over an optical fiber, wherein the MAC control message comprises:
    a destination_address that is set equal to a destination_address parameter of a MAC control information (MA_CONTROL.request);
    a source_address that is set equal to an individual address of a station;
    a length/type field within a mac data unit that is set to 88-08; and
    a remainder of the mac data unit that is set to a concatenation of an extension opcode, an International Telecommunication Union (ITU) Standardization Sector (ITU-T) organizationally unique identifier (OUI), and organization-specific data comprising a format determined by the ITU-T, wherein the extension opcode indicates that the MAC control message comprises formatting specified by the ITU-T.

20. The OLT of claim 19, wherein the individual address is 48 bits.

21. An optical network unit (ONU) comprising:
    an optical transmitter; and
    a data framer coupled to the optical transmitter and configured to frame a media access control (MAC) control message for transmission by the optical transmitter over an optical fiber, wherein the MAC control message comprises:
    a destination_address that is set equal to a destination_address parameter of a MAC control information (MA_CONTROL.request);
    a source_address that is set equal to an individual address of a station;
    a length/type field within a mac data unit that is set to 88-08; and
    a remainder of the mac data unit that is set to a concatenation of an extension opcode, an International Telecommunication Union (ITU) Standardization Sector (ITU- T) organizationally unique identifier (OUI), and organization-specific data comprising a format determined by the ITU-T, wherein the extension opcode indicates that the MAC control message comprises formatting specified by the ITU-T.

22. An apparatus comprising:
a receiver configured to accept a media access control (MAC) control message comprising:
  a destination_address that is set equal to a destination_address parameter of a MAC control information (MA_CONTROL.request),
  a source_address that is set equal to an individual address of a station,
  a length/type field within a mac data unit that is set to 88-08, and
  a remainder of the mac data unit that is set to a concatenation of an extension opcode, an International Telecommunication Union (ITU) Standardization Sector (ITU-T) organizationally unique identifier (OUI), and organization-specific data comprising a format determined by the ITU-T, wherein the extension opcode indicates that the MAC control message comprises formatting specified by the ITU-T; and
a processor coupled to the receiver and configured to parse the MAC control message.

* * * * *